United States Patent
Kwon et al.

(10) Patent No.: US 11,662,229 B2
(45) Date of Patent: May 30, 2023

(54) OPTICAL FIBER BOCDA SENSOR USING PHASE CODE MODULATION OF PUMP LIGHT AND PROBE LIGHT WHICH HAVE TIME DIFFERENCE

(71) Applicant: KOREA RESEARCH INSTITUTE OF STANDARDS AND SCIENCE, Daejeon (KR)

(72) Inventors: Il-Bum Kwon, Daejeon (KR); Dae-Cheol Seo, Daejeon (KR); Chi-Yeop Kim, Daejeon (KR); Bo-Hun Choi, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 11 days.

(21) Appl. No.: 17/055,037

(22) PCT Filed: May 16, 2019

(86) PCT No.: PCT/KR2019/005884
§ 371 (c)(1),
(2) Date: Nov. 12, 2020

(87) PCT Pub. No.: WO2019/221534
PCT Pub. Date: Nov. 21, 2019

(65) Prior Publication Data
US 2021/0215515 A1 Jul. 15, 2021

(30) Foreign Application Priority Data

May 16, 2018 (KR) .................. 10-2018-0055702

(51) Int. Cl.
*G01D 5/353* (2006.01)
*G01K 11/322* (2021.01)
*G01L 1/24* (2006.01)

(52) U.S. Cl.
CPC ....... *G01D 5/35364* (2013.01); *G01K 11/322* (2021.01); *G01L 1/242* (2013.01)

(58) Field of Classification Search
CPC .. G01D 5/35364; G01K 11/322; G01K 11/32; G01L 1/242
See application file for complete search history.

(56) References Cited

U.S. PATENT DOCUMENTS 7,283,216 B1 * 10/2007 Geng ................. G01D 5/35303
356/477
7,873,273 B2 * 1/2011 Koyamada ........... G01M 11/319
356/73.1
(Continued)

FOREIGN PATENT DOCUMENTS

EP 3232165 A1 * 10/2017 ......... G01D 5/35358
GB 2441154 A * 2/2008 ......... G01D 5/35364
(Continued)

OTHER PUBLICATIONS

Zan et al. "A New Electrical Signal Configuration for Modulating Pump Light of Coded Discrete-Phase Shift Pulse-BOTDA", 3rd International Conference on Photonics 2012, Penang, Oct. 1-3, 2012.*

(Continued)

*Primary Examiner* — Mohamed K Amara
(74) *Attorney, Agent, or Firm* — Knobbe Martens Olson & Bear LLP

(57) ABSTRACT

The present invention relates to an optical fiber BOCDA sensor. A purpose of the present invention is to provide an optical fiber BOCDA sensor which uses two phase codes to control a correlation peak position, thereby further simplifying control design and device configuration and improving spatial resolution to enhance a sensing performance and detection accuracy in comparison with the prior art.

8 Claims, 13 Drawing Sheets

(56) References Cited

U.S. PATENT DOCUMENTS

| | | | | |
|---|---|---|---|---|
| 9,163,958 | B2* | 10/2015 | Zadok | G01D 5/268 |
| 10,028,667 | B2* | 7/2018 | Kishida | G01D 5/35361 |
| 10,359,302 | B2* | 7/2019 | Hartog | G01D 5/35364 |
| 2004/0208413 | A1* | 10/2004 | Scandale | G01K 13/006 |
| | | | | 374/E11.015 |
| 2008/0193126 | A1* | 8/2008 | Yamamoto | G01M 11/319 |
| | | | | 374/E11.015 |
| 2010/0165327 | A1* | 7/2010 | Hartog | G01K 11/32 |
| | | | | 356/73.1 |
| 2014/0083197 | A1 | 3/2014 | Zadok et al. | |
| 2015/0168253 | A1* | 6/2015 | Chin | G01M 11/3109 |
| | | | | 356/73.1 |
| 2016/0109223 | A1* | 4/2016 | Wang | G01B 11/168 |
| | | | | 356/32 |
| 2017/0248448 | A1* | 8/2017 | Horiguchi | H01S 5/0071 |

FOREIGN PATENT DOCUMENTS

| | | | | |
|---|---|---|---|---|
| JP | 2009-047455 | A | | 3/2009 |
| JP | WO2010061718 | A1* | 6/2010 | G01D 5/353 |
| JP | 5322162 | B2 | | 10/2013 |
| JP | 2014-044129 | A | | 3/2014 |
| JP | 2015-197384 | A | | 11/2015 |
| JP | 2017-015681 | A | | 1/2017 |
| JP | 2017-040576 | A | | 2/2017 |
| JP | 2017-053645 | A | | 3/2017 |
| JP | 2017-116423 | A | | 6/2017 |
| KR | 10-1310783 | B1 | | 9/2013 |
| KR | 10-1358942 | B1 | | 2/2014 |
| WO | 2007-086357 | A1 | | 8/2007 |
| WO | 2009-104751 | A1 | | 8/2009 |
| WO | WO-2012156559 | A1* | 11/2012 | G01D 5/35364 |
| WO | WO-2015170116 | A1* | 11/2015 | G01D 5/35361 |

OTHER PUBLICATIONS

International Search Report of PCT Application No. PCT/KR2019/005884—4 pages (dated Aug. 22, 2019).

Zadok et al., "Random-access distributed fiber sensing", Laser & Photonics Reviews, vol. 6, No. 5—5 pages (Jun. 28, 2012).

Ashida, et al. "Discriminative distributed measurement of strain and temperature based on Brillouin dynamic grating by BOCDA with time-division pump-probe generation scheme", Laser and Electro-Optics (CLEO), 2012 Conference on, IEEE, pp. 1-2. (May 6, 2012).

Extended European Search Report in Application No. 19803784.8 dated Jan. 28, 2022 in 8 pages.

Hotate "Recent achievements in BODCDA/BOCDR", IEEE Sensors 2014 Proceedings, IEEE, pp. 142-145. (Nov. 2, 2014).

Matsumoto, et al. "Discriminative and distributed measurement of temperature and strain with time-division pump-probe-read light generation by single laser diode in simplified BOCDA system", Proceedings of SPIE, IEEE, US, vol. 9157, pp. 91573W-91573W. (May 22, 2014).

Office Action in Japanese Application No. 2020-562148 dated Jan. 6, 2022 in 6 pages.

Taki, et al. "Hybrid Raman/Brillouin-optical-time-domain-analysis-distributed optical fiber sensors based on cyclic pulse coding" Optic Letters, Optical Society of America, US, vol. 38, No. 20, pp. 4162-4165. (Oct. 15, 2013).

* cited by examiner (A)

(B)

PRBS2 = bit shifted PRBS1

(A)

PRBS2 = delayed PRBS1

(B)

OPTICAL FIBER BOCDA SENSOR USING PHASE CODE MODULATION OF PUMP LIGHT AND PROBE LIGHT WHICH HAVE TIME DIFFERENCE

TECHNICAL FIELD

The present invention relates to an optical fiber Brillouin correlation domain analysis (BOCDA) sensor, and more particularly, to an optical fiber BOCDA sensor having improved detection performance and detection accuracy.

BACKGROUND ART

A phenomenon in which light interacts with sound waves present in a material to be scattered at a frequency different from that of incident light is called Brillouin scattering, and here, a difference between these frequencies is called Brillouin frequency shift. An optical fiber BOCDA sensor is a distribution measuring sensor that acquires the Brillouin frequency shift $\Delta v_B$ at all positions along a length of a sensing fiber. A brief description of a principle of detecting the Brillouin frequency shift is as follows. Pumping light (or pump light) and probe light are controlled to be incident respectively from both ends of an optical fiber to be measured (or measurement target optical fiber), and an optical frequency is adjusted so that the optical frequency difference $\Delta v$ between the pumping and probe light matches the Brillouin frequency shift value $v_B$ of the measurement target optical fiber. In this case, the pumping light is energy-converted into probe light due to stimulated Brillouin scattering and the probe light is Brillouin light amplified within the measurement target optical fiber. An optical signal of the amplified probe light may be converted into an electric signal by a photo detector so as to be measured.

Such a Brillouin frequency shift value is significantly affected by a material through which light travels, i.e., a material of an optical fiber and changes according to a strain applied to the optical fiber. When a strain of the optical fiber due to external stress is $\Delta \epsilon$ and a temperature change is $\Delta T$, a change amount $\Delta v_B$ of the Brillouin frequency shift value is expressed as Equation 1. In the following equation, a strain conversion factor $C\epsilon$ and a temperature conversion factor $C_T$ are known values, but it is more preferable to accurately check and use these factors according to actual application conditions in order to increase accuracy. When a standard single-mode optical fiber is used as a sensing fiber, the strain conversion factor $C\epsilon$ is about 0.05 MHz/με and the temperature conversion factor $C_T$ is about 1 MHZ/oC, but exact values should be checked and used according to actual application conditions.

$$\Delta v_B = C_\epsilon \cdot \Delta\epsilon + C_T \cdot \Delta T \qquad \text{[Equation 1]}$$

When the Brillouin frequency shift is acquired, a strain or a temperature distributed in the sensing fiber may be measured using Equation 1, and a sensor made based on this principle is referred to as an optical fiber BOCDA sensor. In order to obtain the Brillouin frequency shift distributed in such a sensing fiber, a Brillouin gain spectrum should be acquired from all positions of the sensing fiber, and the optical fiber BOCDA sensor of the related art uses a phase code frequency control method that scans a frequency during phase code modulation.

FIG. 1 is a schematic view of a phase code frequency control type optical fiber BOCDA sensor of the related art. As shown in FIG. 1, light emitted from one light source is modulated by a phase modulator to have a difference of 180 degrees in a pseudo random bit sequence (PRBS) code pattern. The phase-modulated light is branched by a 1×2 optical fiber coupler and used as pumping light and probe light. The probe light is modulated in optical frequency near the Brillouin frequency by an electro-optic modulator and then incident to one end of the sensing fiber. Meanwhile, the pumping light passes through an optical circulator and then is incident to the other end of the sensing fiber. As these two lights travel through the sensing fiber, there is a time during which phases of the two lights always match at a first encountering bit of a phase code but do not match at a position of another bit. When the time during which the phases match is equal to or greater than 10 ns of a phonon lifetime of an acoustic wave, Brillouin scattering amplification occurs, thereby obtaining a Brillouin frequency. However, the time during which the phases match is shorter than the phonon lifetime of the acoustic wave at different positions of the two lights, so that Brillouin scattering amplification does not occur, and thus Brillouin gain cannot be obtained.

Meanwhile, the bit position where the two lights first meet in the sensing fiber does not change even if the frequency of the PRBS code is changed. However, the position is changed at a second or greater correlation bit position when the frequency of the phase code is changed. Therefore, in order to obtain a Brillouin amplified signal at a certain position in the sensing fiber, a delay fiber needs to be provided so that a detection section may be set at a second or greater correlation position. Accordingly, the Brillouin scattered amplified light obtained by a photo receiver converts a signal generated only at the correlation bit of the PRBS code into an electric signal. In a computer, a Brillouin gain spectrum is obtained by converting an electrical signal into a digital signal using an analog-to-digital converter (ADC) and a Brillouin frequency is obtained to obtain a temperature or strain according to Equation 1.

FIG. 2 shows an embodiment of driving a phase code frequency-control type optical fiber BOCDA sensor of the related art, which is a configuration example realized by more concretely implementing the device shown in the schematic view of FIG. 1. In the embodiment of FIG. 2, the entire system is controlled by a data acquisition program of a computer. This program adjusts an operation of a pulse pattern generator (PPG), a signal generated by the PPG is input to a phase modulator (PM), and the PM modulates a phase of light output from a distributed feedback laser diode (DFB LD). In the embodiment of FIG. 2, the light output from LD may have a peak wavelength of 1553 nm and an intensity of 35 mW. The PPG generates an electrical signal of a pseudo random bit sequence (PRBS) pattern, and a symbol duration of one bit of the signal is set to be much shorter than the phonon lifetime of an acoustic wave generated in stimulated Brillouin scattering (SBS). A phase of one bit of the PRBS is modulated to one of 0 and π, and probabilities of occurrence of both states are the same. The modulated optical signal is divided by a 3 dB optical fiber coupler to generate probe light and pumping light. The probe light and the pumping light, which are phase-modulated and continuously oscillate, travel in opposite directions of a closed loop and then meet exactly at a midpoint of the loop and interact to generate a correlation peak. If the two lights meet again over the entire length of the phase code, a correlation peak is generated again at that position.

FIG. 3 is a view illustrating a change in a correlation peak position in an optical fiber based on phase code frequency modulation when the phase code frequency control type optical fiber BOCDA sensor of the related art is driven. As shown in FIG. 3, if a length of one phase code bit is T time, a distance width of a correlation peak created when the probe light and the pumping light meet is calculated as $\Delta d = (1/2) v_g T$ (here, $v_g$ is a group speed of light in the optical fiber). If a loop length of the optical fiber is longer than a total length of the PRBS bits, the correlation peak is formed periodically as shown in FIG. 3 along a loop of the optical fiber.

Here, a correlation peak formed exactly at a middle position after passing through a 3 dB optical fiber coupler, which is a branch point of the optical signal, is called a zero-order correlation peak. In this case, there is no path difference between the two traveling lights. If two lights are intended to meet at a deviating position, rather than at exactly the middle in the sensing fiber, that is, if an order of a first formed correlation peak is intended not to be a zero order, an intentional path difference should be introduced while the probe light and the pumping light travel. To this end, a delay fiber (refer to FIGS. 1 and 2) for a path difference is inserted at a position close to the probe light. A position of the correlation peak thusly formed on the loop depends on a length of the delay fiber. The distance $\Delta d_n$ between the correlation peaks may be expressed as $\Delta d_n = N \Delta d = (1/2) N v_g T$, where N is the length of the PRBS code. In an experiment, $2^{15}-1$ bits were used as the length. The length of the sensing fiber to be used for measurement is made shorter than $\Delta d_n$ so that only one correlation peak may be formed in the closed loop. When the PRBS frequency is changed, a time width of one bit changes from T to T', so that the length of the entire PRBS changes and the position of the correlation peak also shifts. The degree of this position shift is greater as the order of the correlation peak increases. The shift of the peak must be less than or equal to $\Delta d$, which is the distance width of the peak, to ensure a distance resolution of the optical fiber to be measured. This explanation may be expressed as an equation as follows.

$$\left( \frac{1}{2} N v_g T' - \frac{1}{2} N v_g T \right) \times \frac{\overline{DL}}{\overline{PL}} = \frac{1}{2} v_g T \quad \text{[Equation 2]}$$

Here, $\overline{DL}$ and $\overline{PL}$ are a distance between the length of the delay fiber and the correlation peak. Since a time width of one bit is the reciprocal of a modulation bit rate (BR), a change rate of the BR for moving a measurement position of the optical fiber is $\Delta BR = BR - BR'$. Equation 3 may be obtained by simplifying Equation 2 using the equation for the BR change rate.

$$\frac{\Delta d}{\overline{DL}} \times BR = \Delta BR \quad \text{[Equation 3]}$$

Equation 3 refers to an interval of the BR at which the measurement position in the sensing fiber should be changed. This interval is proportional to the modulation frequency and the distance width of one bit and inversely proportional to the length of the delay fiber.

A paper such as "Random-access distributed fiber sensing" (Avi Zadok etc., Laser Photonics Rev. 6, No. 5, L1-L5, 2012) discloses a sensor configuration including a delay fiber like the phase code frequency modulation type optical fiber BOCDA sensor of the related art as described above. However, the technique of the related art has several problems such as a problem in that it is difficult to modulate a phase code frequency, a problem in that a correlation peak width changes according to phase code frequency modulation, a problem in that a delay fiber must be installed, and a problem in that it is not easy to determine where the correlation peak is to be located in a sensing fiber, and the like.

RELATED ART DOCUMENT

Non-Patent Document

1. "Random-access distributed fiber sensing" (Avi Zadok etc., Laser Photonics Rev. 6, No. 5, L1-L5, 2012)

DISCLOSURE

Technical Problem

An object of the present invention is to provide an optical fiber BOCDA sensor using phase code modulation of pumping light and probe light having a time difference capable of improving detection performance and detection accuracy by improving spatial resolution, while simplifying a control design and device configuration compared with the related art, by controlling a correlation peak position using two phase codes.

Technical Solution

In one general aspect, an optical fiber BOCDA sensor 100 using phase code modulation of pumping light and probe light having a time difference, which measures a strain and a temperature at a certain position on a sensing fiber 140 using Brillouin frequency shift, includes a probe light phase modulator 121 and a pumping light phase modulator 131, which can be independently controlled, on a probe light optical fiber line 120 and a pumping light optical fiber line 130, respectively, so that a time difference is formed in a phase code pattern created in each of the probe light phase modulator 121 and the pumping light phase modulator 131, thereby adjusting a correlation peak position of pumping light and probe light on the sensing fiber 140.

Here, the optical fiber BOCDA sensor 100 may be configured to adjust the phase code patterns respectively created in the probe light phase modulator 121 and the pumping light phase modulator 131 to have the same form but have only a time difference.

In addition, the optical fiber BOCDA sensor 100 may adjust a time difference of the phase code patterns respectively created in the probe light phase modulator 121 and the pumping light phase modulator 131 so that the correlation peak position corresponds to a position of the sensing fiber 140 on which measurement is to be performed.

In addition, the optical fiber BOCDA sensor 100 may adjust bit widths of the phase code patterns respectively created in the probe light phase modulator 121 and the pumping light phase modulator 131 according to a length of a section of a position on the sensing fiber 140 on which measurement is to be performed.

In addition, the optical fiber BOCDA sensor 100 may perform control to subtract a Brillouin spectrum obtained using a phase code pattern in which a bit width of a correlation peak position has a second size smaller than a predetermined first size from a Brillouin spectrum obtained using a phase code pattern in which a bit width of a correlation peak position has the first size, to improve spatial resolution.

As a more specific configuration, the optical fiber BOCDA sensor 100 may include: a light source 110; an optical fiber coupler 115 dividing light traveling from the light source 110 through an optical fiber into lights traveling to the probe light optical fiber line 120 and the pumping light optical fiber line 130, respectively; the sensing fiber 140 having one end connected to an end of the probe light optical fiber line 120 and the other end connected to the pumping light optical fiber line 130 and causing amplification to Brillouin scattered light scattered to a rear of pumping light if there is a difference as large as a Brillouin frequency between frequencies of probe light and pumping light; the probe light phase modulator 121 provided on the probe light optical fiber line 120 and modulating a phase of the probe light to a predetermined phase code pattern; a probe light electro-optic modulator 122 provided on the probe light optical fiber line 120 and adjusting probe light traveling from the probe light phase modulator 121 to have frequency modulation near the Brillouin frequency of the sensing fiber 140; an optical fiber isolator 125 provided on the probe light optical fiber line 120, causing probe light traveling from the probe light electro-optic modulator 122 to travel toward the sensing fiber 140, and blocking light traveling from the sensing fiber 140; the pumping light phase modulator 131 provided on the pumping light optical fiber line 130 and modulating a phase of pumping light to a phase code pattern having a time difference from a phase code pattern used in the probe light phase modulator 121; an optical fiber circulator 135 provided on the pumping light optical fiber line 130 and causing probe light traveling from the pumping light phase modulator 131 to travel toward the sensing fiber 140; a photo receiver 150 acquiring Brillouin scattered light traveling from the optical fiber circulator 135; and a controller 160 controlling the phase code patterns respectively generated in the probe light phase modulator 121 and the pumping light phase modulator 131.

Here, the optical fiber BOCDA sensor 100 may further include: a probe light optical fiber amplifier 123 provided at a front of the optical fiber isolator 125 on the probe light optical fiber line 120 and amplifying probe light traveling to the optical fiber isolator 125.

In addition, the optical fiber BOCDA sensor 100 may further include: a polarization scrambler 124 provided between the probe light electro-optic modulator 122 and the optical isolator 125 on the probe light optical fiber line 120 and removing an influence of polarization of the probe light traveling from the probe light electro-optic modulator 122.

In addition, the optical fiber BOCDA sensor 100 may further include: a lock-in amplifier 155 provided at a rear of the photo receiver 150 and amplifying Brillouin scattered light received by the photo receiver 150; and a pumping light electro-optic modulator 132 provided on the pumping light optical fiber line 130 and modulating pumping light traveling from the pumping light phase modulator 131 into a sine wave to drive the lock-in amplifier 155.

In addition, the optical fiber BOCDA sensor 100 may further include: a pumping light optical fiber amplifier 133 provided at a front of the optical fiber circulator 135 on the pumping light optical fiber line 130 and amplifying pumping light traveling to the optical fiber circulator 135.

In addition, the controller 160 may include: a pulse pattern generator 161 connected to the probe light phase modulator 121 and the pumping light phase modulator 131 and generating and applying the phase code patterns respectively used at the probe light phase modulator 121 and the pumping light phase modulator 131; and an RF signal synthesizer 162 connected to the probe light electro-optic modulator 122 and driving the probe light electro-optic modulator 122 by generating an electric signal near the Brillouin frequency of the sensing fiber 140.

In addition, the controller 160 may include a chopping module 163 connected to the pumping light electro-optic modulator 132 and the lock-in amplifier 155 and controlling light at regular time intervals.

Advantageous Effects

According to the present invention, the process of modulating an optical frequency to control a correlation peak position in the phase code frequency modulation type optical fiber BOCDA sensor of the related art is excluded, and instead, a process of using control of two phase codes having a time difference to control the correlation peak position is used, thereby realizing more simplified control design and device configuration compared to the related art. Accordingly, various problems of the phase code frequency modulation method of the related art described above may be fundamentally eliminated.

More specifically, the related art has a problem in that it is difficult to modulate the phase code frequency and a problem in that the correlation peak width varies according to the phase code frequency modulation. However, in the present invention, phase modulators which may be controlled separately from each other are used, and thus control design may be made much easier. In addition, the related art has a problem in that a delay fiber must be installed, but in the present invention, there is no need to install the delay fiber, thus simplifying device configuration. In addition, the related art has a problem in that it is not easy to determine where the correlation peak position is located in the sensing fiber, but in the present invention, the correlation peak position may be allocated as desired, and thus control design is made much easier.

In addition, according to the present invention, since the correlation peak position may be arbitrarily controlled as desired, spatial resolution may be improved and detection performance and detection accuracy may be fundamentally improved.

DETAILED DESCRIPTION OF MAIN ELEMENTS

Figure 1:
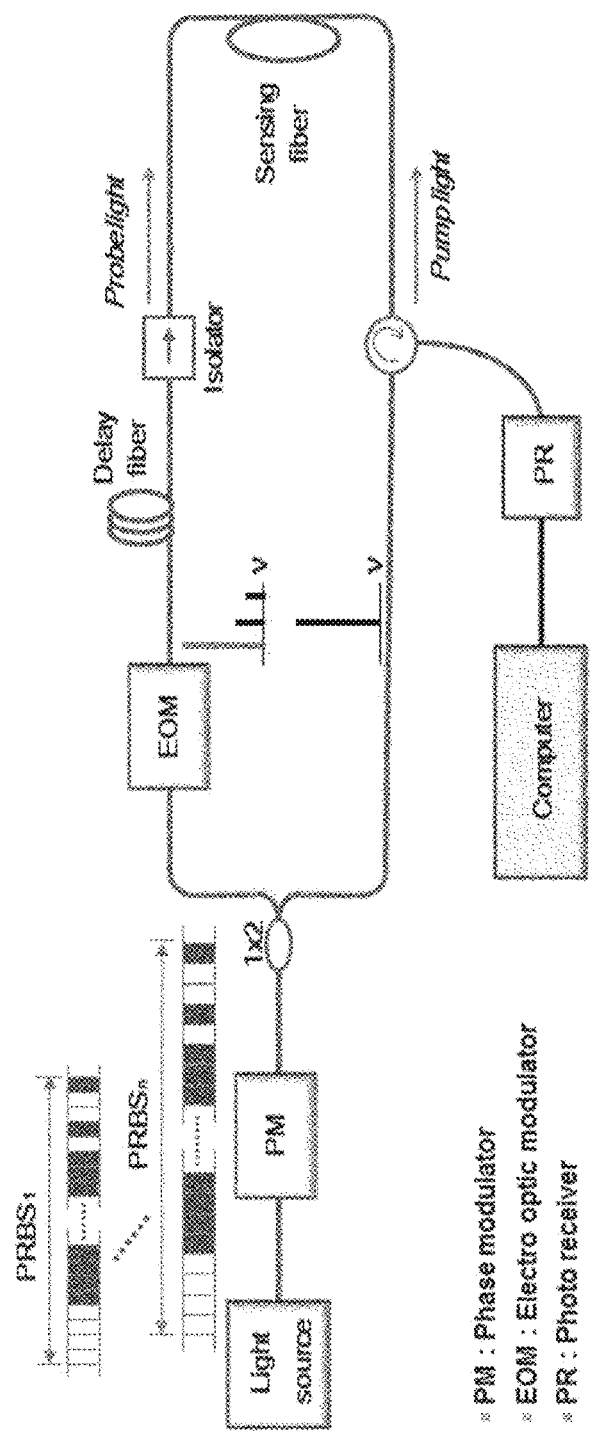
FIG. 1 is a schematic view of the phase code frequency control type optical fiber BOCDA sensor of the related art.
Figure 2:
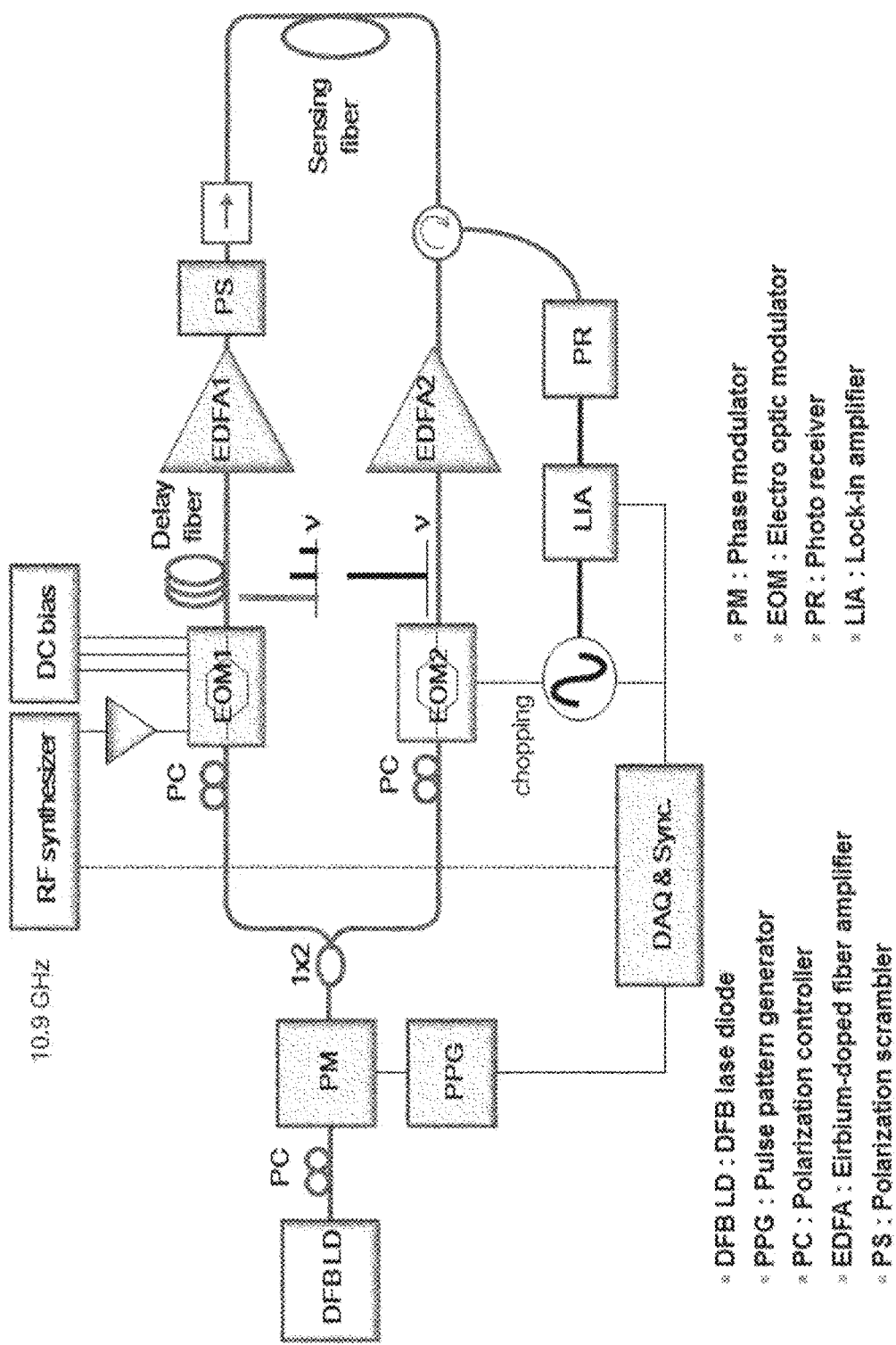
FIG. 2 shows an embodiment of driving the phase code frequency control type optical fiber BOCDA sensor of the related art.
Figure 3:
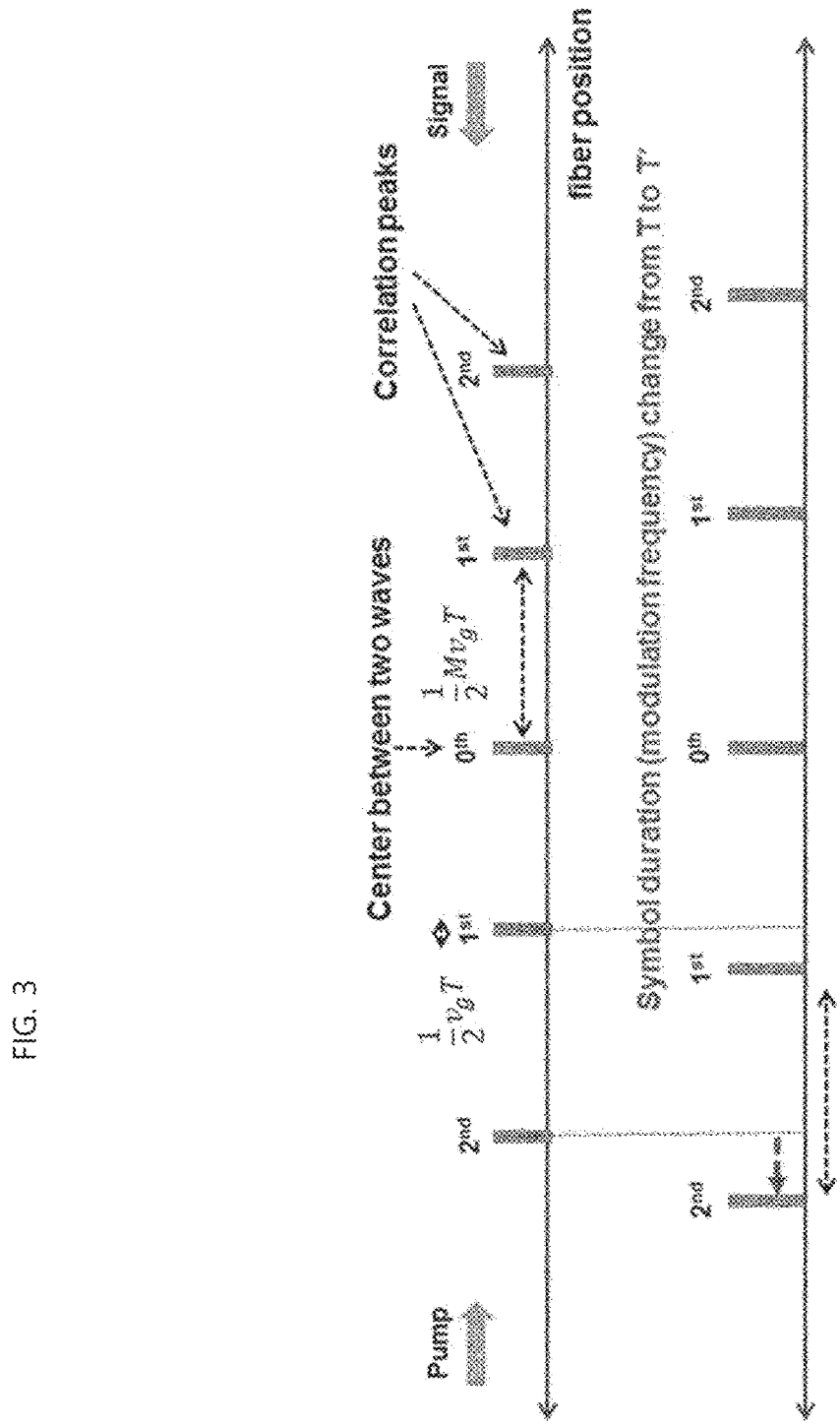
FIG. 3 shows a change in a correlation peak position in an optical fiber based on phase code frequency modulation when the phase code frequency control type optical fiber BOCDA sensor of the related art is driven.

100: optical fiber BOCDA sensor
110: light source
115: optical fiber coupler
120: probe light optical fiber line
121: probe light phase modulator
122: probe light electro-optic modulator
123: probe light optical fiber amplifier
124: polarization scrambler
125: optical fiber isolator
130: pumping light optical fiber line
131: pumping light phase modulator
132: pumping light electro-optic modulator
133: pumping light optical fiber amplifier
135: optical fiber circulator
140: sensing fiber
150: photo receiver
155: lock-in amplifier
160: controller
161: pulse pattern generator
162: RF signal synthesizer
163: chopping module

BEST MODE

Hereinafter, an optical fiber Brillouin correlation domain analysis (BOCDA) sensor using phase code modulation of a pumping light and a probe light having a time difference according to the present invention having the configuration described above will be described in detail with reference to the accompanying drawings.

[1] Principle of Improving Optical Fiber BOCDA Sensor of Present Invention

As described above, in the related art, an optical frequency is modulated to control a correlation peak position, and in this process, there were problems that obscure various control designs and device configurations. The present invention discloses an optical fiber BOCDA sensor that replaces the process of modulating an optical frequency with a new method using two phase codes to control the shortcomings of the optical fiber BOCDA sensor of the related art, i.e., the correlation peak position.

Figure 4:
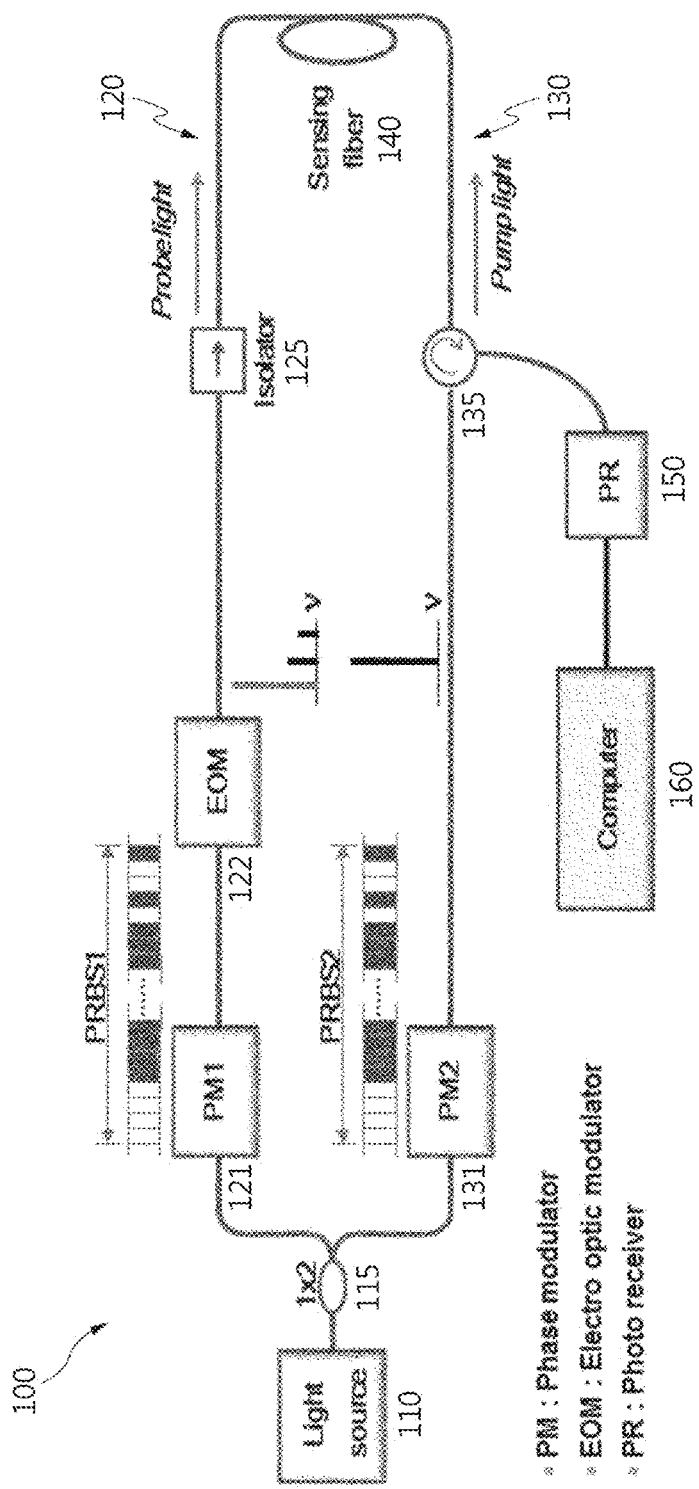
FIG. 4 is a schematic view of an optical fiber BOCDA sensor using two phase codes having a time difference of the present invention.

FIG. 4 is a schematic view of an optical fiber BOCDA sensor using two phase codes having a time difference of the present invention. The optical fiber BOCDA sensor 100 of the present invention basically measures a strain and a temperature at a certain position on a sensing fiber 140 using a Brillouin frequency shift and includes a probe light optical fiber line 121 and a pumping light phase modulator 131, which can be independently controlled, at a probe light optical fiber line 120 and a pumping light optical fiber line 130, respectively. Here, in the optical fiber BOCDA sensor 100 of the present invention, a correlation peak position of pumping light and probe light can be adjusted by forming a time difference between phase code patterns created by the probe light phase modulator 121 and the pumping light phase modulator 131.

Specifically, in the optical fiber BOCDA sensor 100 of the present invention, the phase code patterns created by the probe light phase modulator 121 and the pumping light phase modulator 131 have the same shape but have only a time difference.

The optical fiber BOCDA sensor of the related art shown in FIG. 1 with the optical fiber BOCDA sensor 100 of the present invention shown in FIG. 4 may be intuitively compared as follows. In the optical fiber BOCDA sensor of the related art, the delay fiber is provided on the probe light optical fiber line so that lights having the same phase code pattern are incident on the probe light optical fiber line and the pumping light optical fiber line and a Brillouin amplified signal is obtained at a certain position on the sensing fiber. In contrast, the optical fiber BOCDA sensor 100 of the present invention includes the probe light phase modulator 121 and the pumping light phase modulator 131, which can be independently controlled, at the probe light optical fiber line 120 and the pumping light optical fiber line 130, respectively. That is, in the present invention, in order to generate a time delay between phase codes of the probe light and the pumping light, it is only necessary to properly set each phase code pattern so that a time delay is formed between lights produced by the phase modulators 121 and 131. That is, in the present invention, there is no need to provide the delay fiber as a requisite in the optical fiber BOCDA sensor of the related art.

Here, as described above, in the optical fiber BOCDA sensor of the related art, since the certain relationship is formed among the modulation frequency, the rate of change of the modulation frequency, the length of the delay fiber, and the distance between the correlation peaks, where the correlation peak position is to be located in the sensing fiber should be previously determined and the length of the delay fiber should be determined in consideration of the location of the correlation peak position, causing difficulties in control design and device configuration. However, in the present invention, since the delay fiber itself is eliminated from the configuration, the difficulties in the control design and device configuration related to the delay fiber are fundamentally eliminated. In addition, since the phase modulators 121 and 131 are controlled independently of each other, one phase modulator may be set to perform modulation with a certain phase code pattern and the other phase modulator may be set to perform modulation with the same phase code pattern. It is also freely possible for the phase code patterns to be set to have the same shape and have a time delay as desired. Of course, in determining the time delay value, the time delay value may be freely set as desired without any particular limitation, and as a result, it is possible to dramatically facilitate control design and device configuration compared to the related art.

[2] Principle of Operation of Optical Fiber BOCDA Sensor of Present Invention

A basic configuration and operation principle of the optical fiber BOCDA sensor 100 of the present invention will be described in detail with reference to FIG. 4. The optical fiber BOCDA sensor 100 of the present invention may basically include a light source 110, an optical fiber coupler 115, a probe light optical fiber line 120, a pumping light optical fiber line 130, and a sensing fiber 140, and may further include a probe light phase modulator 121, a probe light optical electro-optic modulator 122, an optical fiber isolator 125, a pumping light phase modulator 131, an optical fiber circulator 135, a photo receiver 150, and a controller 160. Each part will be described briefly.

First, the light source 110, the optical fiber coupler 115, and the sensing fiber 140, which are basic components, will be briefly described.

The light source 110 outputs light for an overall operation of the sensor. Here, in order to improve operation efficiency, it is preferable that the light output from the light source 110 has good coherence, and as a specific example, the light source 110 may include a single distributed feedback (DFB) laser diode.

The optical fiber coupler 115 is configured in the form of a 1×2 optical fiber coupler and serves to divide light traveling through the optical fiber from the light source 110 to travel to each of probe light optical fiber line 120 and the pumping light optical fiber line 130.

The sensing fiber 140 is a part in which a detection signal to be acquired is generated. One end of the sensing fiber 140 is connected to an end of the probe light optical fiber line 120, and the other end thereof is connected to the pumping light optical fiber line 130. Accordingly, probe light and pumping light travel from both ends of the sensing fiber 140, and two lights meet each other in the sensing fiber 140. Here, if there is a difference by a Brillouin frequency between the frequencies of the probe light and the pumping light, the Brillouin scattered light scattered to a rear of the pumping light is amplified. As described above, the frequency shift value of the Brillouin scattered light is directly related to a strain and a temperature at a certain position on the sensing fiber 140. Accordingly, it is possible to ultimately measure a strain and a temperature change at a certain position on the sensing fiber 140 by acquiring the Brillouin scattered light and measuring the Brillouin frequency shift.

Next, the probe light phase modulator 121, the probe light electro-optic modulator 122, and the optical fiber isolator 125 arranged on the probe light optical fiber line 120 will be briefly described.

The probe light phase modulator 121 is provided on the probe light optical fiber line 120 and serves to modulate a phase of the probe light with a predetermined phase code pattern. The phase code pattern may be freely set appropriately as desired by a user.

The probe light electro-optic modulator 122 is provided on the probe light optical fiber line 120 and serves to adjust probe light traveling from the probe light phase modulator 121 to have frequency modulation near a Brillouin frequency of the sensing fiber 140.

The optical fiber isolator 125 is provided on the probe light optical fiber line 120 and serves to cause the probe light traveling from the probe light electro-optic modulator 122 to travel toward the sensing fiber 140. In addition, the optical fiber isolator 125 also serves to block light traveling from the sensing fiber 140.

Next, each of the pumping light phase modulator 131 and the optical fiber circulator 135 arranged on the pumping optical fiber line 130 will be briefly described.

The pumping light phase modulator 131 is provided on the pumping light optical fiber line 130 and serves to modulate a phase of pumping light like the probe light phase modulator 121. Here, a phase code pattern used in the pumping light phase modulator 131 in the present invention is a pattern having a time difference from a phase code pattern used in the probe light phase modulator 121.

The optical fiber circulator 135 is provided on the pumping optical fiber line 130 and causes probe light traveling from the pumping light phase modulator 131 toward the sensing fiber 140, like the optical fiber isolator 125.

Finally, each of the photo receiver 150 and the controller 160 for acquiring and controlling light will be briefly described.

The photo receiver 150 serves to acquire Brillouin scattered light traveling from the optical fiber circulator 135. The photo receiver 150 is connected to the controller 160 and transmits the acquired optical signal data to the controller 160 so that signal analysis may be performed.

The controller 160 most basically serves to control the phase code patterns generated in the probe light phase modulator 121 and the pumping light phase modulator 131 and serves to control and analyze various other devices.

The overall operation of the optical fiber BOCDA sensor 100 of the present invention configured as described above will be described as follows.

Light emitted from the light source 110 is divided in the optical fiber coupler 115 and used as probe light and pumping light. These two lights are phase-modulated into PRBS code patterns by the phase modulators 121 and 131, respectively, and there is a time difference between the two PRBS code patterns. The probe light is adjusted to have a frequency modulation near the Brillouin frequency by the probe light electro-optic modulator 122 and is then input to one end of the sensing fiber 140. Meanwhile, the pumping light passes through the optical fiber circulator 135 and is input to the other end of the sensing fiber 140. As such, when the pumping light and the probe light meet in the sensing fiber 140, if there is a difference in frequency between the frequencies of the two lights by the Brillouin frequency of the sensing fiber 140, amplification occurs in the light scattered to the rear of the pumping light. The frequency of the Brillouin scattered light which is amplified and travels to the rear of the pumping light is proportional to a strain or a temperature of the sensing fiber 140.

Here, since the pumping light and the probe light are phase-modulated with PRBS codes before being incident on the sensing fiber 140, phases thereof always match at a position by a bit width where two codes first meet in the sensing fiber 140 and there is a time during which phases thereof do not match at another position of the PRBS codes. Thus, the Brillouin amplification, in which the back scattered light is increased, occurs only at a bit position in which the phases of the PRBS code patterns of the pumping light and the probe light in the sensing fiber 140 match.

For this reason, the photo receiver 150 acquiring the Brillouin scattered light acquires a Brillouin scattered light gain signal which is made only at a position by one bit width of the PRBS code. In this way, the probe light modulation frequency under the condition that the Brillouin scattering gain signal is maximally obtained is the Brillouin frequency at the corresponding position of the sensing fiber 140, and thus a strain or a temperature may be obtained by Equation 1. Meanwhile, in order to obtain the Brillouin frequency at another position of the sensing fiber 140, the time difference between the PRBS codes, which are phase modulation patterns of the pumping light and the probe light, may need to be changed.

[3] Embodiment of Driving Optical Fiber BOCDA Sensor of Present Invention

Figure 5:
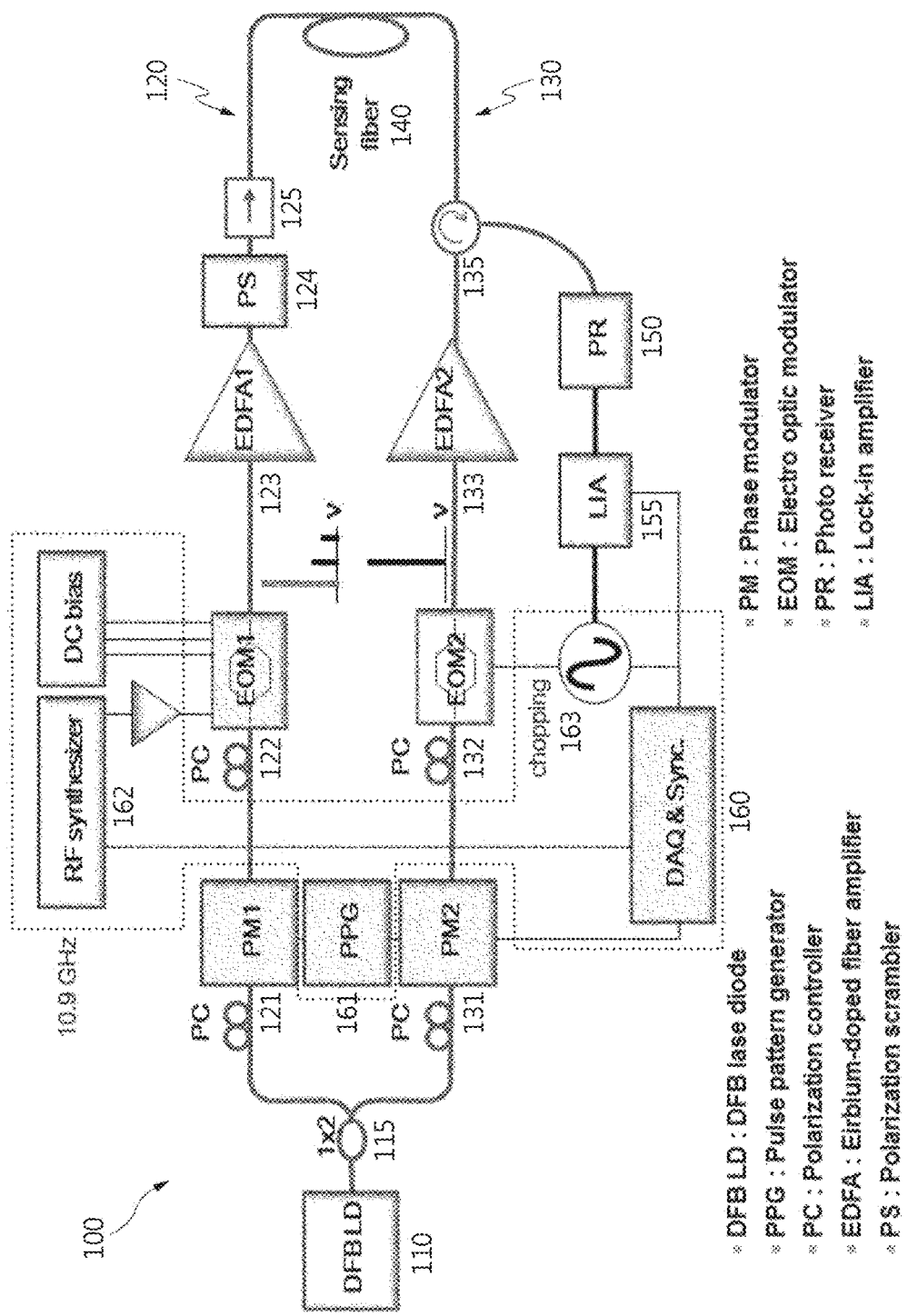
FIG. 5 shows an embodiment of driving an optical fiber BOCDA sensor using two phase codes having a time difference of the present invention.

FIG. 5 shows an embodiment of driving the optical fiber BOCDA sensor using two phase codes having a time difference of the present invention. In the embodiment of FIG. 5, the optical fiber BOCDA sensor using two phase codes having a time difference of the present invention may further include a probe light optical fiber amplifier 123, a polarization scrambler 124, a pumping light electro-optic modulator 132, a pumping light optical fiber amplifier 133, and a lock-in amplifier 155 in addition to the components shown in FIG. 4. In addition, the controller 160 may include a pulse pattern generator 161, an RF signal synthesizer 162, and a chopping module 163. Each part is briefly described as follows.

First, each of the components further included in the optical fiber BOCDA sensor 100 will be briefly described.

The probe light optical fiber amplifier 123 and the pumping light optical fiber amplifier 133 serve to amplify pumping light and probe light entering the sensing fiber 140, respectively. Specifically, the probe light optical fiber amplifier 123 is provided in front of the optical fiber isolator 125 on the probe light optical fiber line 120 and amplifies probe light traveling to the optical fiber isolator 125. In addition, the pumping optical fiber amplifier 133 is provided in front of the optical fiber circulator 135 on the pumping light optical fiber line 130 and amplifies pumping light traveling to the optical fiber circulator 135.

The polarization scrambler (PS) 124 is provided between the probe light electro-optic modulator 122 and the optical isolator 125 on the probe light optical fiber line 120 and serves to remove an influence of polarization in the probe light traveling from the probe light electro-optic modulator 122.

The pumping light electro-optic modulator 132 and the lock-in amplifier 155 should be provided together. First, the lock-in amplifier 155 is provided at the rear of the photo receiver 150 and serves to amplify the Brillouin scattered light received by the photo receiver 150. In addition, the pumping light electro-optic modulator 132 is provided on the pumping optical fiber line 130 and modulates pumping light traveling from the pumping light phase modulator 131 into a sine wave to drive the lock-in amplifier 155.

Next, each of the pulse pattern generator (PPG) 161, the RF signal synthesizer 162, and the chopping module 163 included in the controller 160 will be briefly described.

The pulse pattern generator 161 is connected to the probe light phase modulator 121 and the pumping light phase modulator 131 and serves to generate phase code patterns respectively used in the probe light phase modulator 121 and the pumping light phase modulator 131 and apply the generated phase code patterns. The patterns generated by the pulse pattern generator 161 may be freely adjusted by the user.

The RF signal synthesizer 162 is connected to the probe light electro-optic modulator 122 and serves to generate an electric signal near the Brillouin frequency of the sensing fiber 140 to drive the probe light electro-optic modulator 122.

The chopping module 163, which serves to control light at regular time intervals, is connected to the pumping light electro-optic modulator 132 and the lock-in amplifier 155 as illustrated. As will be described in detail later, the pumping light electro-optic modulator 132 and the lock-in amplifier 155 may be eliminated according to a control method of the optical fiber BOCDA sensor 100 of the present invention. In this case, the chopping module 163 may also be eliminated.

A specific operation of the optical fiber BOCDA sensor 100 of the present invention configured as described above will be described as follows.

As in the embodiment of FIG. 4, light emitted from the light source 110 formed of a high-power DFB laser diode is divided by a 3 dB optical fiber coupler 115 and used as probe light and pumping light. These two lights are phase-modulated by the phase modulators 121 and 131, respectively, and in the embodiment of FIG. 5, the pulse pattern generator 161 controlled by a computer and having two channels is connected to each of the phase modulators 121 and 131 to adjust PRBS code patterns respectively generated by the phase modulators 121 and 131. A phase of one bit of a PRBS is one of 0 and π, and a probability of occurrence of two phase bits is almost the same within one code.

Figure 6:
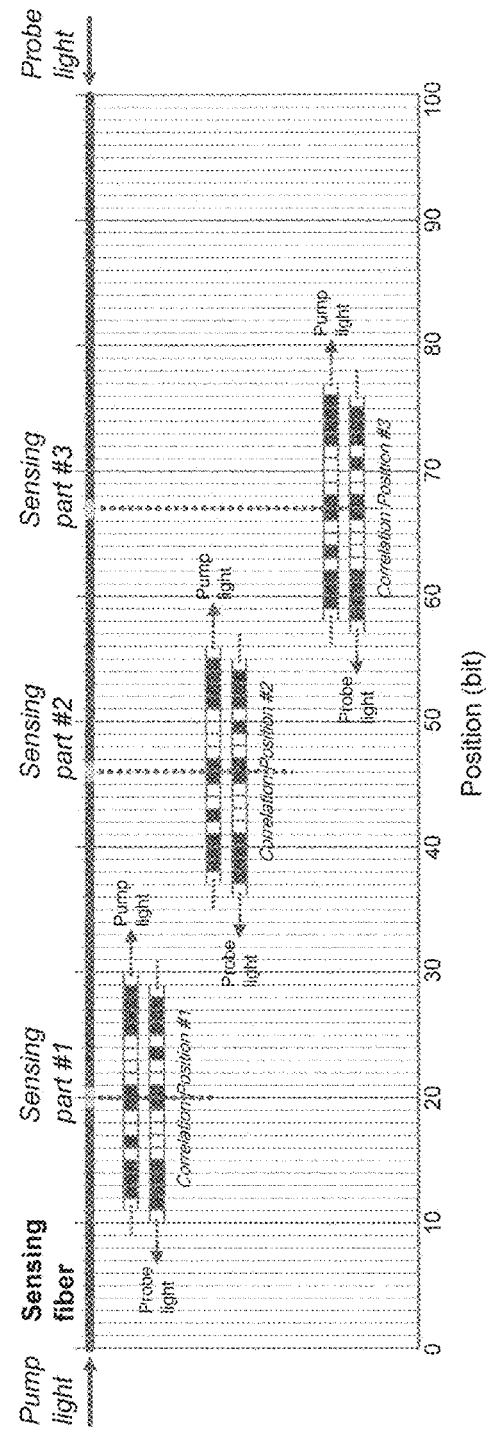
FIG. 6 shows an embodiment of adjusting a position where a correlation peak occurs in an optical fiber based on a change in a time difference between phases of pumping light and probe light when the optical fiber BOCDA sensor using two phase codes having a time difference of the present invention is driven.

FIG. 6 shows an embodiment of adjusting a position of occurrence of a correlation peak in an optical fiber based on a change in time difference between the phases of pumping light and probe light when the optical fiber BOCDA sensor using two phase codes having a time difference of the present invention is driven. The two PRBS code patterns in the above description are completely the same but have only a time difference, and the time difference between the two patterns may be arbitrarily controlled by a computer. Accordingly, the position where the phases of the phase code-modulated pumping light and probe light match each other, that is, the position of the occurrence of the correlation peak, may be adjusted to a certain position as shown in FIG. 6. In other words, the correlation peak region may be obtained by causing a phase of a bit width of one very short phase code to always match at a certain position on the sensing fiber 140 using the probe light phase modulator 121 and the pumping light phase modulator 131, and here, a Brillouin gain may be obtained. A distance width $\Delta d$ of the correlation peak may be obtained by a formula $\Delta d=(\frac{1}{2})v_g T$, where $v_g$ is a group speed of light traveling inside the optical fiber and T is a time width of one bit of the PRBS signal. A symbol duration of the one bit is generally set much shorter than 10 ns, a minimum time to cause stimulated Brillouin scattering (SBS). That is, it is possible to operate with a spatial resolution shorter than 1 m.

Meanwhile, in order to find a Brillouin frequency $v_B$, a frequency difference between the pumping light and the probe light must be controlled. In the present invention, the frequency difference is controlled by modulating the frequency of the probe light by the probe light electro-optic modulator 122. Specifically, the probe light is made into an electric signal near the Brillouin frequency using the RF signal synthesizer 162, the electric signal is amplified by an amplifier (an amplifier provided between the RF signal synthesizer 162 and the probe light electro-optic modulator 122 in FIG. 5), and the frequency of the probe light is modulated by driving the probe light electro-optic modulator 122. The probe light modulated into the Brillouin frequency band is amplified by the probe light optical fiber amplifier 123. It is preferable to randomly adjust a polarization direction by a polarization scrambler 124 to remove the influence of polarization inside the sensing fiber 140 with respect to the probe light, and the probe light completed in several modulations and adjustment passes through the optical fiber isolator 125 and is incident on the sensing fiber 140. Meanwhile, the pumping light is on-off modulated by the pumping light electro-optic modulator 132 and is used as a signal for triggering the lock-in amplifier 155. Here, the chopping module 163 is used to smoothly perform such on-off modulation. Thereafter, the pumping light is amplified by the pumping light optical fiber amplifier 133, passes through the optical fiber circulator 135, and is incident on the sensing fiber 140.

In this way, the pumping light incident and traveling into the sensing fiber 140 causes Brillouin amplification at a peak position of correlation with the probe light and then scatters backward and returns. The Brillouin scattered light is converted into an electrical signal, while passing through the optical circulator 135 and the photo receiver 150. This signal is amplified by the lock-in amplifier 155 and converted into a digital signal by a data acquisition program of the controller 160 and stored. The data acquisition and control program operated by the controller 160 controls the pulse pattern generator 161, the RF signal synthesizer 162, and the chopping module 163 and acquires a signal of the lock-in amplifier 155 connected to the photo receiver 150.

An actual experiment was performed using embodiment of driving the optical fiber BOCDA sensor 100 of the present invention, and detailed operating conditions in this case are as follows. A frequency of the phase code of the PRBS pattern was set to 5 GHz and a spatial resolution was set to 2 cm. In addition, a length of the PRBS pattern was set to $2^7-1=511$, so that a maximum length of the sensing fiber that may be used was 511×2 cm=1,022 cm. Meanwhile, the probe light electro-optic modulator 122 for Brillouin frequency detection was set to scan a 0.6 GHz range from 10.4 GHz to 11 GHz. In addition, a time of one period of the Brillouin frequency detection was set to 50 msec, and data was acquired at a speed of 24 kHz at the time of frequency scanning, so that 10 Brillouin gain spectra were acquired to obtain an average value and a maximum value to obtain the Brillouin frequency.

Figure 7:
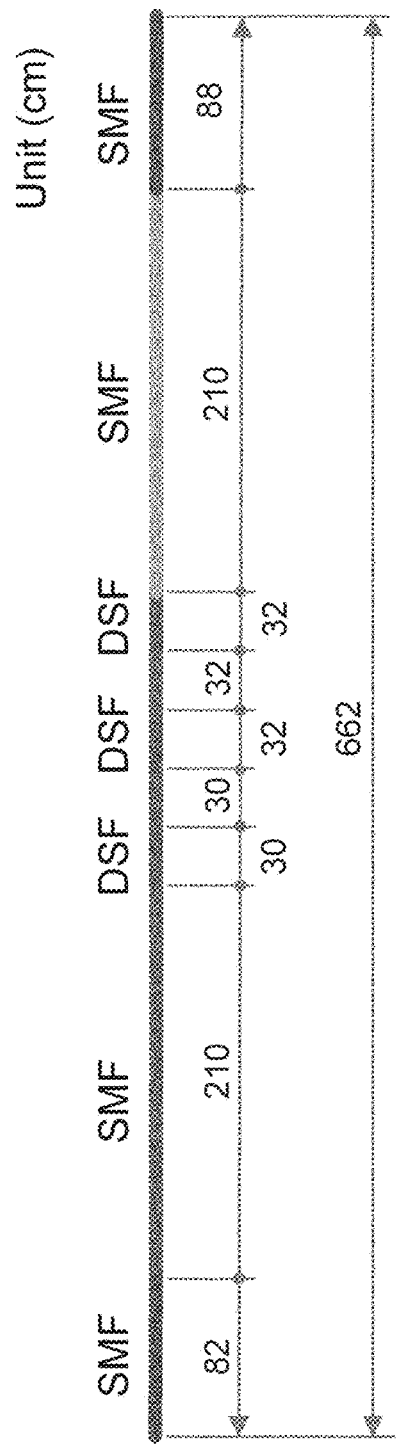
FIG. 7 shows an embodiment of a configuration of a sensing fiber used in an experiment of driving an optical fiber BOCDA sensor using two phase codes having a time difference of the present invention.

FIG. 7 shows a configuration embodiment of a sensing fiber used in an experiment for driving an optical fiber BOCDA sensor using two phase codes having a time difference of the present invention. In the embodiment of FIG. 7, the sensing fiber 140 was made by fusion splicing a single mode optical fiber and a dispersion shift fiber (DSF), and the Brillouin frequency for each optical fiber was detected to confirm a possibility of measuring strain. In the case of single-mode optical fiber, four types of optical fibers with different Brillouin frequencies were fusion-spliced together.

Figure 8:
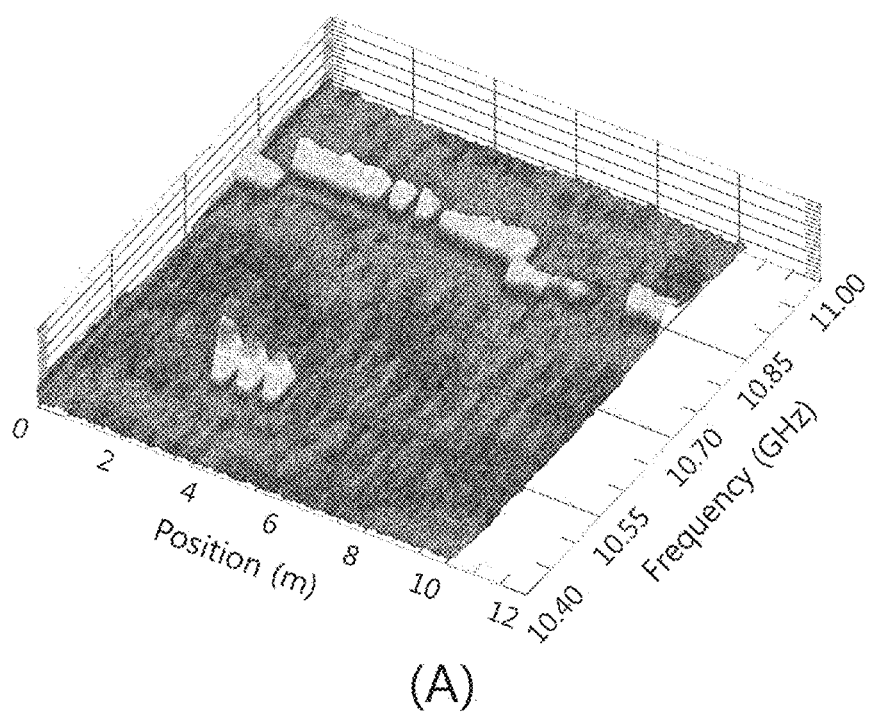
FIG. 8 shows a Brillouin gain spectrum acquired using the sensing fiber of FIG. 7.
Figure 8:
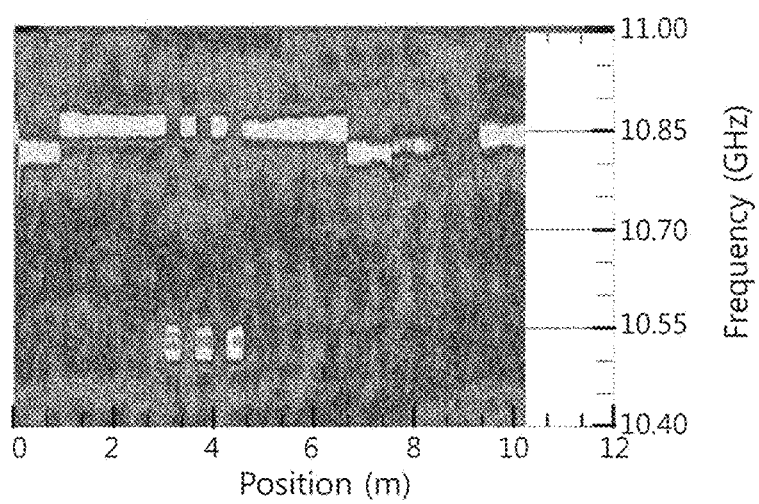

FIG. 8 shows a Brillouin gain spectrum acquired using the sensing fiber of FIG. 7. (A) of FIG. 8 shows a Brillouin gain spectrum three-dimensionally, and (B) of FIG. shows a Brillouin gain spectrum two-dimensionally by representing a height value in (A) of FIG. 8 in color. As shown in FIG. 8, a Brillouin gain distribution in which a gain peak can be definitely determined at each position was obtained. In particular, in the sensing fiber of FIG. 7, the dispersion shift fibers (DSFs) are connected to 3 parts that are each 30 cm, and here, it can be seen that the gain spectrum of this part is very clearly divided in the 2D spectrum. Meanwhile, there is a part where the gain does not exist, which is the rest of the phase code where the optical fiber does not exist. That is, a phase code that scans 1,022 cm is used, and a part from 8.6 m to 9.4 m is a part without an optical fiber.

Figure 9:
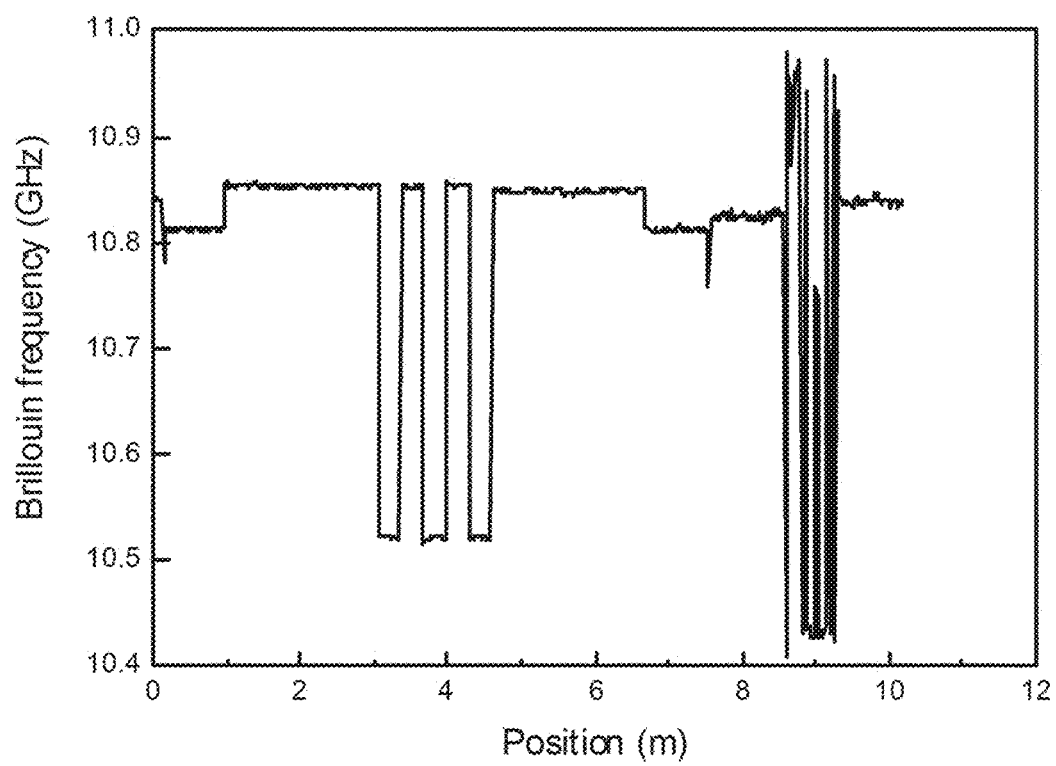
FIG. 9 shows a Brillouin frequency obtained from the Brillouin gain spectrum of FIG. 8.

FIG. 9 shows a Brillouin frequency obtained from the Brillouin gain spectrum of FIG. 8. That is, a frequency of the part having the maximum gain value is obtained from the Brillouin gain spectrum of FIG. 8 and is determined as the Brillouin frequency as shown in FIG. 9, which is a value corresponding to a strain or a temperature. In the graph of FIG. 9, a region where the sensing fiber 140 is actually present is a part corresponding to a length of a total 6.62 m, starting from 0.12 m to 7.14 m on the x axis. When comparing from the left of the sensing fiber 140 of FIG. 7, a single mode optical fiber having a Brillouin frequency of 10.82 GHz by a length of 82 cm is present, and thereafter, a single mode optical fiber having another Brillouin frequency of 10.85 GHz by 210 cm is present, a DSF having a Brillouin frequency of 10.53 GHz is connected by 30 cm, and two more DSFs are further connected. Thereafter, a 210 cm long single-mode optical fiber is connected and the Brillouin frequency is 10.83 GHz, which is slightly smaller than the previous one. Thereafter, an cm long single-mode optical fiber has a Brillouin frequency of 10.83 GHz. That is, it can be seen from the graph of FIG. 9 that the optical fiber BOCDA sensor 100 according to the present invention successfully achieves a spatial resolution of 2 cm, a Brillouin frequency resolution is 0.5 MHz, and a measurement error is 1 MHz.

Figure 10:
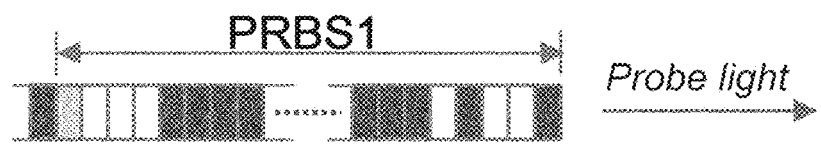
FIG. 10 shows several embodiments of making a time difference between two phase code patterns.
Figure 10:
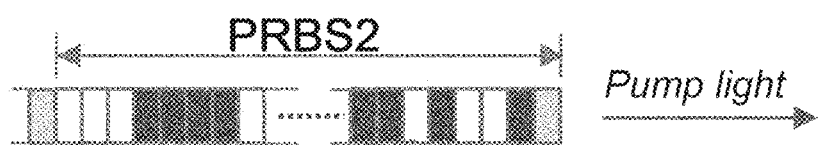
Figure 10:
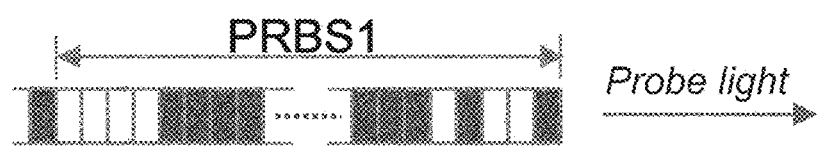
Figure 10:
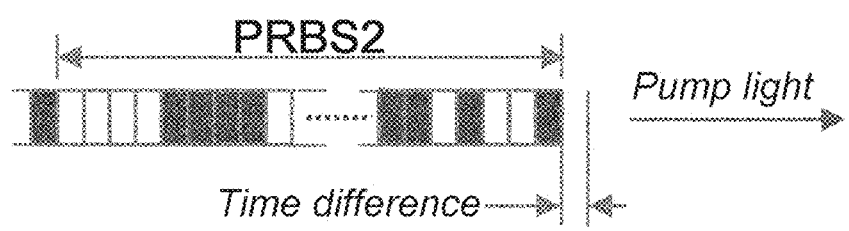

[4] Detailed Principle of Optical Fiber BOCDA Sensor of Present Invention: Time Difference Generation As described above, the essence of the present invention is to form two identical phase code patterns having a time difference in the end and to control a correlation peak position of pumping light and probe light using the time difference. Therefore, the process of making the time difference between the two phase code patterns is important. The easiest method, as shown in (A) of FIG. 10, is to create one phase code and to shift the number of bits of the code by a desired position for measurement of the sensing fiber. Another method is a method of controlling a correlation position by continuously generating two phase codes of the same pattern with a time difference as shown in (B) of FIG. 10.

Here, the optical fiber BOCDA sensor 100 of the present invention may adjust a time difference of phase code patterns respectively created by the probe light phase modulator 121 and the pumping light phase modulator 131 so that a correlation peak position corresponds to a position where measurement is to be performed on the sensing fiber 140. Specifically, in the present invention, since a time difference between two phase codes is created in a program and input to the pulse pattern generator 161 so as to be used, the correlation peak position may be allocated by the program at any position desired to be measured on the sensing fiber 140. Brillouin sensor systems of the related art mostly measure while scanning the entire position of the sensing fiber, but in the case of using the optical fiber BOCDA sensor 100 of the present invention, measurement may be easily controlled to be performed only at a corresponding position of the sensing fiber by simply selecting only the time difference between the two phase codes.

[5] Detailed Principle of Optical Fiber BOCDA Sensor of Present Invention: Bit Width Adjustment The optical fiber BOCDA sensor 100 of the present invention adjusts bit widths of phase code patterns respectively created in the probe light phase modulator 121 and the pumping light phase modulator 131 according to a length of a section of a position to be measured on the sensing fiber 140. It is also possible to operate by adjusting the bit widths to correspond to a case where the length of the section to be measured is short or long.

Figure 11:
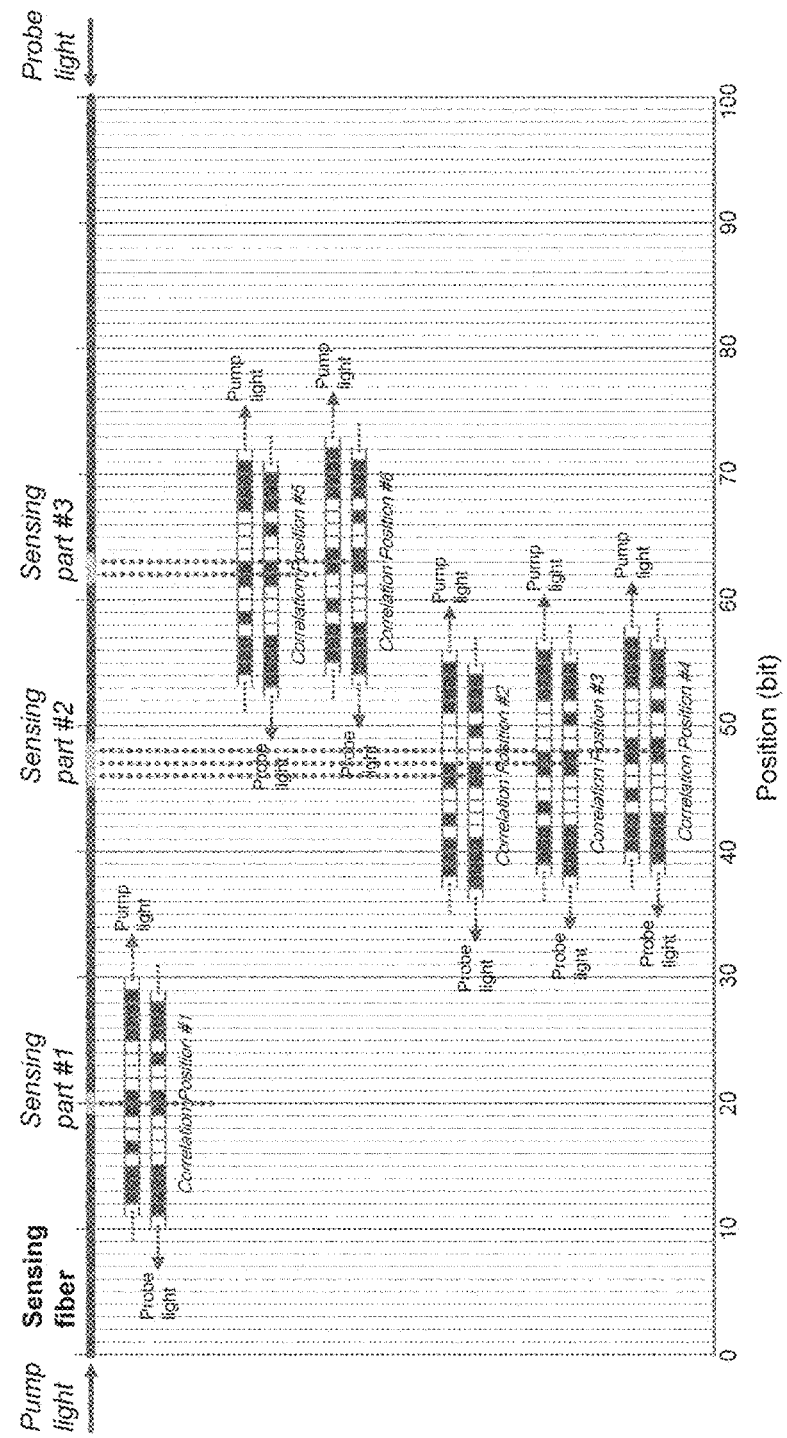
FIGS. 11 and 12 are embodiments of adjusting a bit width according to a length of a correlation peak occurrence section when there are three measurement sections on a sensing fiber.
Figure 12:
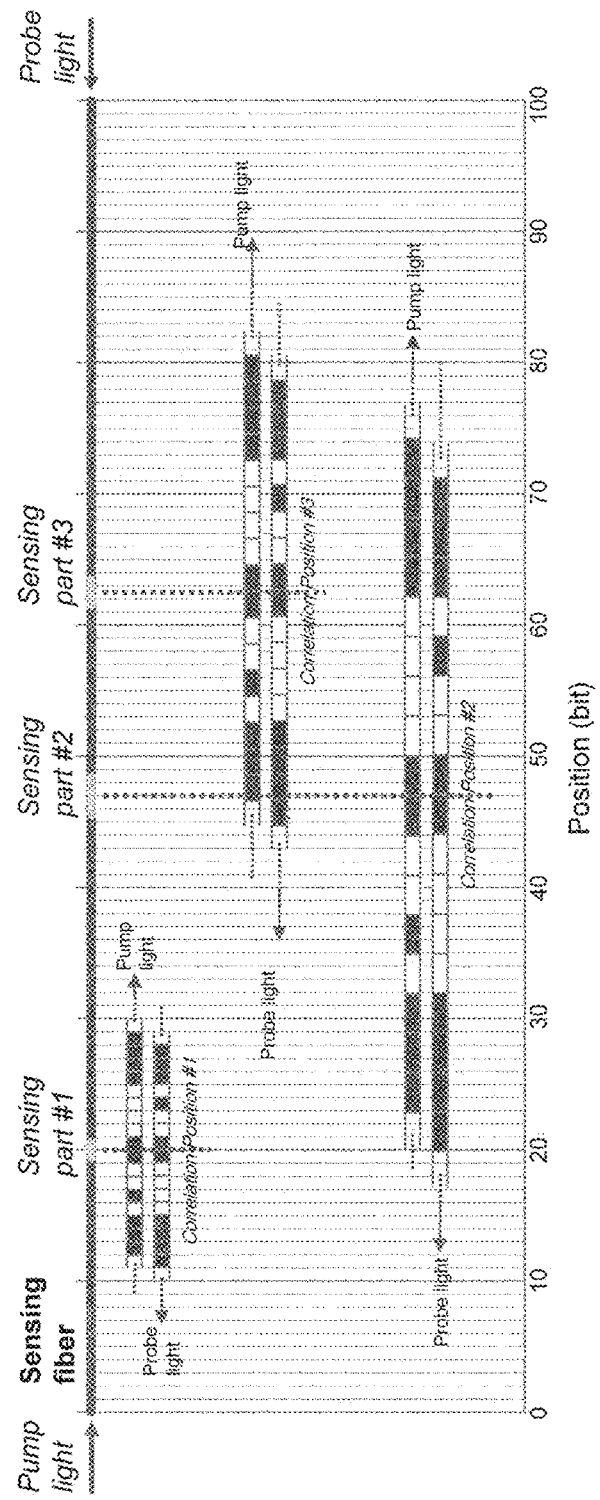

FIGS. 11 and 12 illustrate an embodiment of adjusting a bit width according to a length of a section in which a correlation peak occurs when there are three measurement sections on the sensing fiber. First, in FIG. 11, a case where measurement sections (i.e., sensing parts) #1, #2, and #3 are present on the sensing fiber is considered. In this case, if a correlation peak position occurs at a 20 bit position, the Brillouin gain spectrum corresponding to one bit width at the measurement section #1 position is obtained, and a strain or a temperature is obtained by Equation 1 when a Brillouin frequency giving a maximum value is determined from this spectrum. The length of measurement section #2 is as long as 3 bits wide, so if the peak position is made at 46, 47, 48 bits, 3 strains or temperatures may be obtained at the corresponding position. In addition, since the length of the measurement section #3 has 2 bit widths, two strains or temperatures are measured by causing the peak positions to occur at 62 and 63 bit positions. Meanwhile, as shown in FIG. 12, if the bit width of a pseudo-random bit sequence is almost matched to the length of each measurement section of the sensing fiber and a time difference is set and operated so that the correlation peak occurs at the corresponding position, measurement may need to be performed only once at each measurement position.

[6] Detailed Principle of Optical Fiber BOCDA Sensor of Present Invention: Improvement of Spatial Resolution Meanwhile, when the length of the sensing fiber 140 is long, measurement is performed by increasing the bit width of the correlation peak position to increase the Brillouin gain, and if the bit width is increased in this manner, the spatial resolution is lost by that much. Here, the spatial resolution may be improved by acquiring two Brillouin gains having a difference in bit width of the correlation position and acquiring a signal difference. That is, if the Brillouin spectrum is obtained using a slightly larger bit width and a slightly smaller bit width of the correlation peak position and then a difference thereof is calculated, a value corresponding to the improved spatial resolution corresponding to the difference between the bits at the correlation peak position may be obtained. This method has the possibility to perform measurement without using the pumping light electro-optic modulator 132 and the lock-in amplifier 155.

In summary, the optical fiber BOCDA sensor 100 may perform control to subtract the Brillouin spectrum obtained using a phase code pattern in which a bit width at the correlation peak position has a second size smaller than a predetermined first size from the Brillouin spectrum obtained using a phase code pattern in which a bit width at the correlation peak position has the first size to improve spatial resolution. This will be described with a detailed example as follows.

Figure 13:
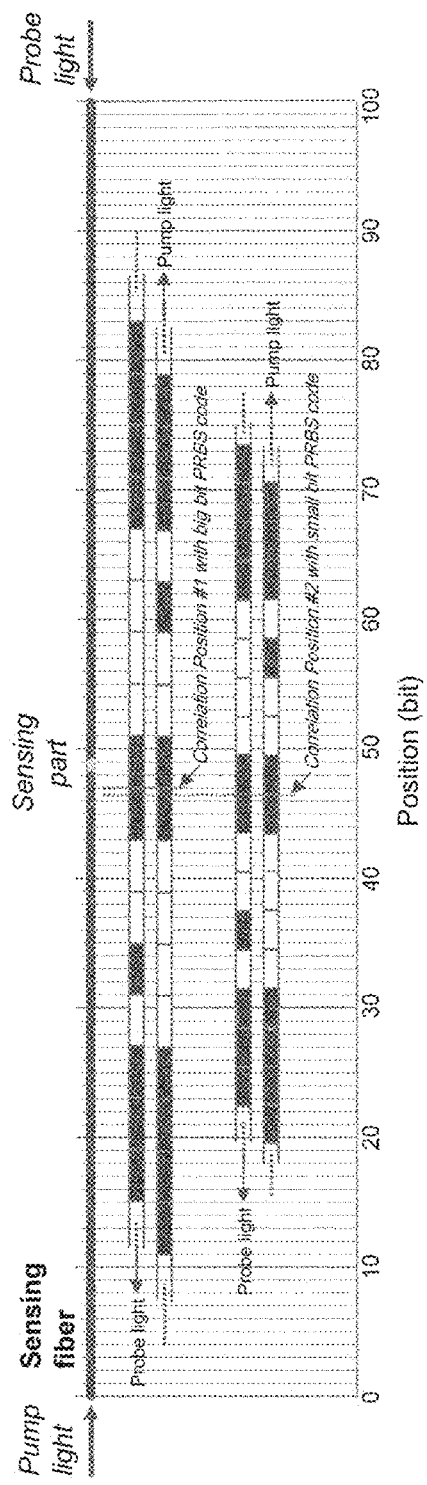
FIG. 13 shows an embodiment of acquiring two Brillouin gains having a difference in bit width of a correlation position to obtain a signal difference thereof.

FIG. 13 shows an embodiment in which two Brillouin gains having a difference in bit width of a correlation position are obtained to obtain a signal difference. In order to obtain information of a bit width corresponding to a difference by subtracting the Brillouin gain spectrum obtained by operating with a slightly smaller bit width from the Brillouin gain spectrum obtained by operating with a large bit width where a start position of the correlation peak position matches, the correlation peak position is made to have a difference by a half of a total bit width to be measured and subtracted from a large bit width, and only a bit width of the remaining part is measured. In the example of FIG. 13, a Brillouin gain spectrum of 4-bit part is obtained with a large bit width, and the correlation peak position is made to have a difference by ½ bits and a Brillouin gain spectrum is obtained by operating with a small bit width and subtracted.

When the bit width of the phase code pattern increases, the Brillouin gain increases. However, it cannot be increased indefinitely. The reason for this is that Brillouin gain occurs if a time during which phases are the same is longer than an acoustic wave phonon lifetime even in a portion other than the correlation peak position. Therefore, there is a value that allows the bit width of the phase code pattern to be set to the maximum. This value will eventually be a bit width under the condition that the difference between the Brillouin gain value occurring at the correlation peak position and the Brillouin gain value occurring at other positions cannot be distinguished from each other. However, the Brillouin gain at positions other than the correlation peak position will eventually be all parts of the entire length of the sensing fiber excluding the correlation peak position.

Then, when the length of the sensing fiber is L, if the bit width of the phase code is 1, the number of bits N=L/1 over the entire length of the sensing fiber. Here, since the correlation peak position is one, the total number of bits of a non-correlation position will be N−1. Increasing the phase code bit width increases the Brillouin gain at the correlation position and at the same time increases the Brillouin gain at N−1 bits at the non-correlation position. When the bit width is increased in this way, if the Brillouin gain at one bit of the correlation position is $I_0$, gains at the correlation positions are indistinguishable if the total sum of the Brillouin gains at the non-correlation position N−1 bits is equal to $I_0$. Therefore, the phase code bit width cannot be increased any more. That is, the bit width here will be a maximum bit width of the sensing fiber in use. If the Brillouin gain at one bit of the non-correlation position is In, $I_n \times (N-1) = I_0$, and thus the bit width in this case becomes the maximum value.

Meanwhile, a minimum value of the bit width of the phase code pattern may be determined as follows. In the case of reducing the phase code pattern, if a phase angle of the phase code pattern is not completely controlled up to 180 degrees, some Brillouin gain $I_{c0}$ occurs in all phase code patterns. Therefore, the Brillouin gain $I_0$ occurring at the correlation peak position of the phase code pattern should be greater than $I_{c0}$ occurring in the entire length of the sensing fiber. That is, when the condition of $I_0 = I_{c0}$ is made, the bit width of the phase code pattern may be minimized. However, if the phase modulation is properly performed and the Brillouin gain at the non-correlation position is smaller than basic signal noise, a minimum bit width at this time becomes a bit width when the Brillouin gain at the correlation position is equal to the signal noise.

The present invention is not limited to the above-mentioned exemplary embodiments but may be variously applied, and may be variously modified by those skilled in the art to which the present invention pertains without departing from the gist of the present invention claimed in the claims.

INDUSTRIAL AVAILABILITY

According to the present invention, by excluding the optical frequency modulation process of the related art and replacing it with the process using two phase code control having a time difference, it is possible to realize a much simplified control design and device configuration compared to the related art. Accordingly, various problems of the phase code frequency modulation method of the related art described above may be fundamentally eliminated. Accordingly, control design may become much easier, device configuration is more simplified, and spatial resolution, detection performance, and detection accuracy are improved.

The invention claimed is:

1. An optical fiber Brillouin optical correlation domain analysis (BOCDA) sensor for measuring a strain and a temperature at a certain position on a sensing fiber using Brillouin frequency shift, comprising:
   a probe light phase modulator on a probe light optical fiber line, wherein the probe light phase modulator is configured to create a first phase code pattern; and
   a pumping light phase modulator on a pumping light optical fiber line, wherein the pumping light phase modulator is configured to create a second phase code pattern and is controllable independently from the probe light phase modulator, wherein the probe light phase modulator and the pumping light phase modulator are further configured to create a time difference between the first phase code pattern created by the probe light phase modulator and the second phase code pattern created by the pumping light phase modulator without using a delay fiber, thereby adjusting a correlation peak position of the pumping light and the probe light on the sensing fiber;

wherein the optical fiber BOCDA sensor is configured to adjust the first and second phase code patterns to be identical to each other except for the time difference, wherein the optical fiber BOCDA sensor is configured to adjust the time difference of the first and second phase code patterns respectively created in the probe light phase modulator and the pumping light phase modulator such that the correlation peak position corresponds to a position of the sensing fiber on which measurement is to be performed, wherein the optical fiber of BOCDA sensor is configured to adjust bit widths of the first and second phase code patterns respectively created in the probe light phase modulator and the pumping light phase modulator according to a length of a section of a position on the sensing fiber on which measurement is to be performed, wherein a maximum value of the bit width is the value of the bit width when a total sum of Brillouin gains at non-correlation position N−1 bits is equal to a Brillouin gain $I_0$ at one bit of a correlation position, wherein a minimum value of the bit width is the value of the bit width when the Brillouin gain $I_0$ occurring at the correlation position is equal to a Brillouin rain $I_{co}$ occurring over an entire length of the sensing fiber, and wherein the optical fiber BOCDA sensor is configured to perform control to subtract a Brillouin spectrum obtained using a phase code pattern in which a bit width of a correlation weak position has a second size smaller than a predetermined first size from a Brillouin spectrum obtained using a phase code Vattern in which a bit width of a correlation peak position has the first size.

2. The optical fiber BOCDA sensor of claim 1, wherein the optical fiber BOCDA sensor comprises:

a light source;

an optical fiber coupler dividing light traveling from the light source through an optical fiber into lights traveling to the probe light optical fiber line and the pumping light optical fiber line, respectively;

the sensing fiber having one end connected to an end of the probe light optical fiber line and the other end connected to the pumping light optical fiber line and causing amplification to Brillouin scattered light scattered to a rear of pumping light if there is a difference as large as a Brillouin frequency between frequencies of probe light and pumping light;

the probe light phase modulator provided on the probe light optical fiber line and modulating a phase of the probe light to a predetermined phase code pattern;

a probe light electro-optic modulator provided on the probe light optical fiber line and adjusting probe light traveling from the probe light phase modulator to have frequency modulation near the Brillouin frequency of the sensing fiber;

an optical fiber isolator provided on the probe light optical fiber line, causing probe light traveling from the probe light electro-optic modulator to travel toward the sensing fiber, and blocking light traveling from the sensing fiber;

the pumping light phase modulator provided on the pumping light optical fiber line and modulating a phase of pumping light to the second phase code pattern having the time difference from the first phase code pattern used in the probe light phase modulator;

an optical fiber circulator provided on the pumping light optical fiber line and causing probe light traveling from the pumping light phase modulator to travel toward the sensing fiber;

a photo receiver acquiring Brillouin scattered light traveling from the optical fiber circulator; and a controller controlling the first and second phase code patterns respectively generated in the probe light phase modulator and the pumping light phase modulator.

3. The optical fiber BOCDA sensor of claim 2, wherein the optical fiber BOCDA sensor further comprises:

a probe light optical fiber amplifier provided at a front of the optical fiber isolator on the probe light optical fiber line and amplifying probe light traveling to the optical fiber isolator.

4. The optical fiber BOCDA sensor of claim 2, wherein the optical fiber BOCDA sensor further comprises:

a polarization scrambler provided between the probe light electro-optic modulator and the optical isolator on the probe light optical fiber line and removing an influence of polarization of the probe light traveling from the probe light electro-optic modulator.

5. The optical fiber BOCDA sensor of claim 2, wherein the optical fiber BOCDA sensor further comprises:

a lock-in amplifier provided at a rear of the photo receiver and amplifying Brillouin scattered light received by the photo receiver; and a pumping light electro-optic modulator provided on the pumping light optical fiber line and modulating pumping light traveling from the pumping light phase modulator into a sine wave to drive the lock-in amplifier.

6. The optical fiber BOCDA sensor of claim 5, wherein the controller is connected to the pumping light electro-optic modulator and the lock-in amplifier and further configured to control the pumping light at regular time intervals.

7. The optical fiber BOCDA sensor of claim 2, wherein the optical fiber BOCDA sensor further comprises:

a pumping light optical fiber amplifier provided at a front of the optical fiber circulator on the pumping light optical fiber line and amplifying pumping light traveling to the optical fiber circulator.

8. The optical fiber BOCDA sensor of claim 2, wherein the controller comprises:

a pulse pattern generator connected to the probe light phase modulator and the pumping light phase modulator and generating and applying the first and second phase code patterns respectively used at the probe light phase modulator and the pumping light phase modulator; and an RF signal synthesizer connected to the probe light electro-optic modulator and driving the probe light electro-optic modulator by generating an electric signal near the Brillouin frequency of the sensing fiber.

\* \* \* \* \*